9642X
J. Turner,
Mechanical Movement.
Patented May 6, 1836.
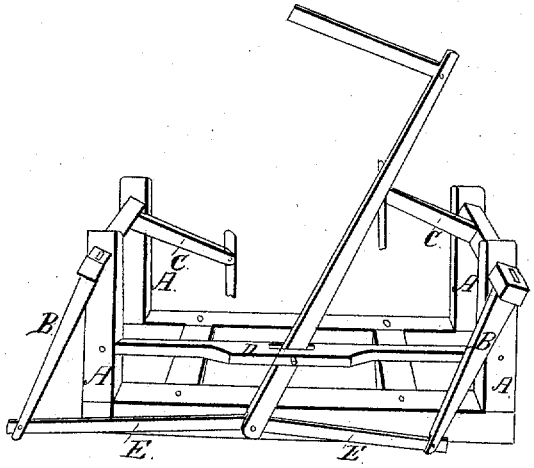
A.M. PHOTO-LITHO. CO. N.Y. (OSBORNE'S PROCESS)

ar. 13

May 6, 1836

229.

Joseph Turner Poland. Me

X9642

Letters Patent

The Schedule referred to in these Letters Patent and making part of the
same Containing a description in the words of the said Joseph Turner
himself of his improvement in the double Lever power for raising water To all to whom these presents shall come Be it known that I Joseph
Turner of Poland County of Cumberland and State of Maine, have in-
-vented a new and useful improvement in a Machine for raising
water and other purposes called the double lever power and that the
following is a full and exact description of the Construction and
opperation of said machine as invented or improved by me. The
sills of this machine are two feet four inches long two inches thick
and three inches wide there are also two cross sills of the same size
of the long ones so framed across by means of tenons and mortises seven
inches from shoulder to shoulder each six inches each side of the centre
of the long sills so as to form an oblong square seven by twelve inches
There are four posts thirteen inches long including the tenons inserted
in each corner of this frame at the extremity of the sills so as to stand
perpendicular as in letter A doth appear. Across these posts and with-
-in two inches of the top there are fitted wrought iron shafts with round
gudgeons in Composition boxes. the shaft one inch and a quarter
square and project on one side three inches and then turns square
down. making what is called the long arm of the machine being
thirteen inches from the top of the shaft to the end and is gradua-
-ted to three fourths of an inch square as in letter B doth appear. On
each of these shafts and in the centre between posts there is welded
horizontally a piece of iron twelve inches long from the inside of
the shaft to the end which is three fourths of an inch square, ma-
-king what is called the short arm, as in letter C doth appear
on the same side of the machine and eight inches down the

X9642 base there is fitted a bar lengthwise of the Machine and secured
at each end of the posts so as to be immoveable through to the centre
of this bar there is a mortice made eight inches long and one
and a half inches wide through which a lever three feet long and
one inch and a half square and is fastened by an iron pin
through the centre of the mortice and six inches from the lower
end of the lever as in letter (D) doth appear. In the top of this
lever is fitted a rod from four to six feet long and one inch in
diameter by which the lever is [illegible] the lever is put perpen
dicular and the long arms pointing directly down. making the
distance each way from the end of the lever to the end of the long
arm twelve inches then there is a mortice made in the end of the
lever and in the end of each of the long arms so as to admit two iron
rods one inch wide and three eighths of an inch thick so put together
in the lever as to form a joint on an iron pin the other ends are fitted
one each way in the end of the long arms with iron pins as in letter
(E) doth appear this is used to raise water is then fitted on the
top of a pump rod or piston made fast to the end of the short arms
and is put in motion by taking hold of the rod which is made fast
in the top of the lever and then giving the arm the motion generally
used in walking. This frame may be fitted on the pumps bored
as usual set at any distance asunder by lengthening or shortening
the frame as the case may require and turning the short arms
[illegible]

What I claim as my invention and not previously
known is the above described machine is the purchase obtained
by the double lever and its application to pump engines &c &c.

Witnesses
Jonas W. [illegible]
Joseph W. Foster

[illegible]

741 wds

[illegible]